No. 854,569. PATENTED MAY 21, 1907.
I. O. CURTICE.
KITCHEN CABINET.
APPLICATION FILED AUG. 17, 1906.
3 SHEETS—SHEET 1.
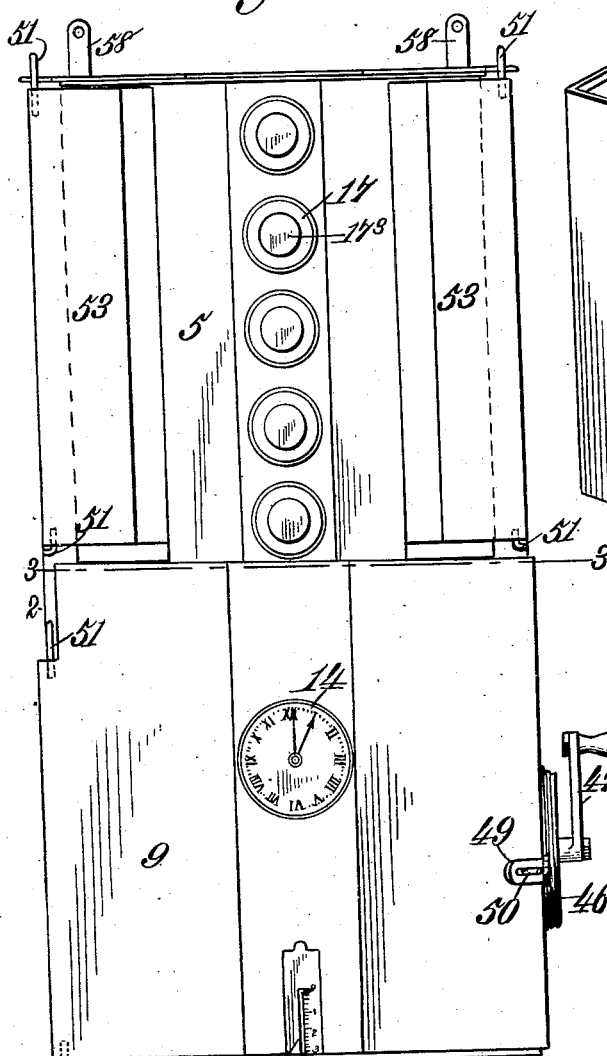
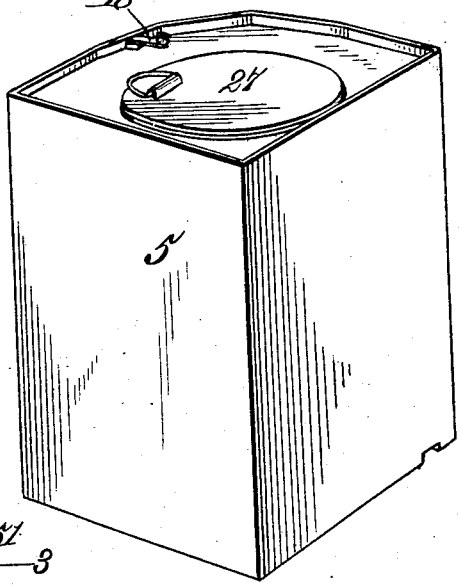
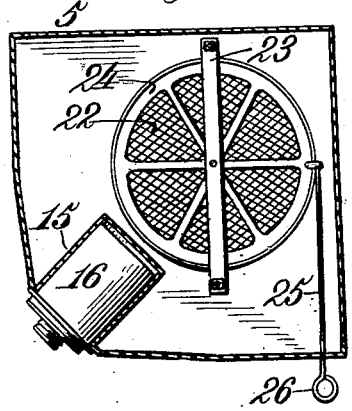
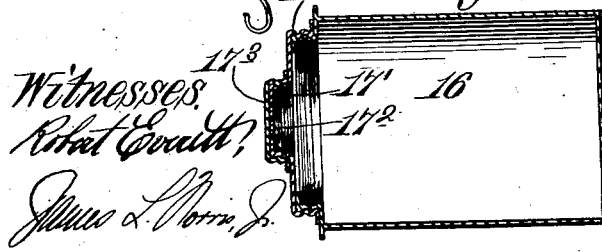
Witnesses
Inventor
Irvin O. Curtice
By James L. Norris
Atty.

No. 854,569. PATENTED MAY 21, 1907.
I. O. CURTICE.
KITCHEN CABINET.
APPLICATION FILED AUG. 17, 1906.
3 SHEETS—SHEET 2.
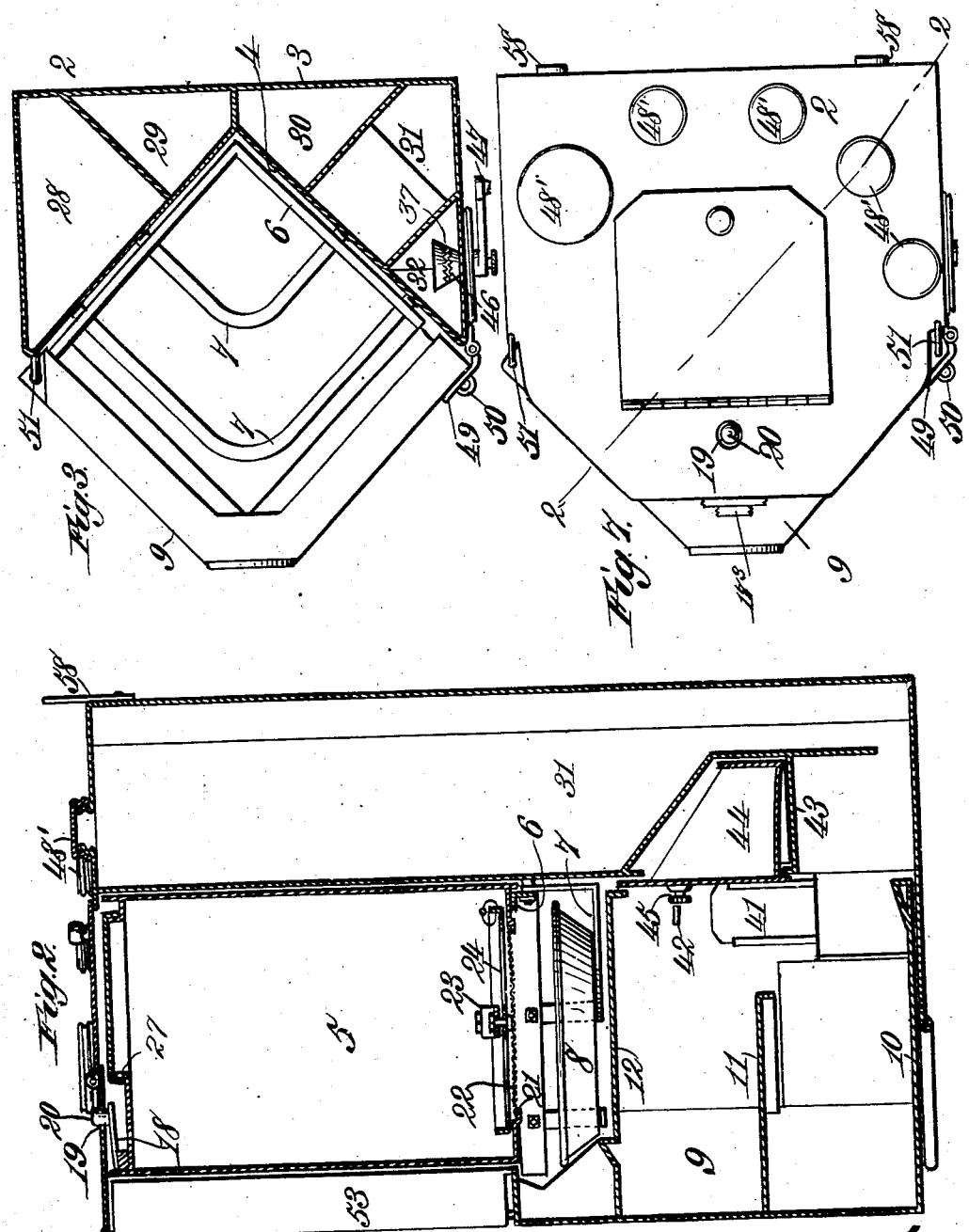

No. 854,569. PATENTED MAY 21, 1907.
I. O. CURTICE.
KITCHEN CABINET.
APPLICATION FILED AUG. 17, 1906.
3 SHEETS—SHEET 3.
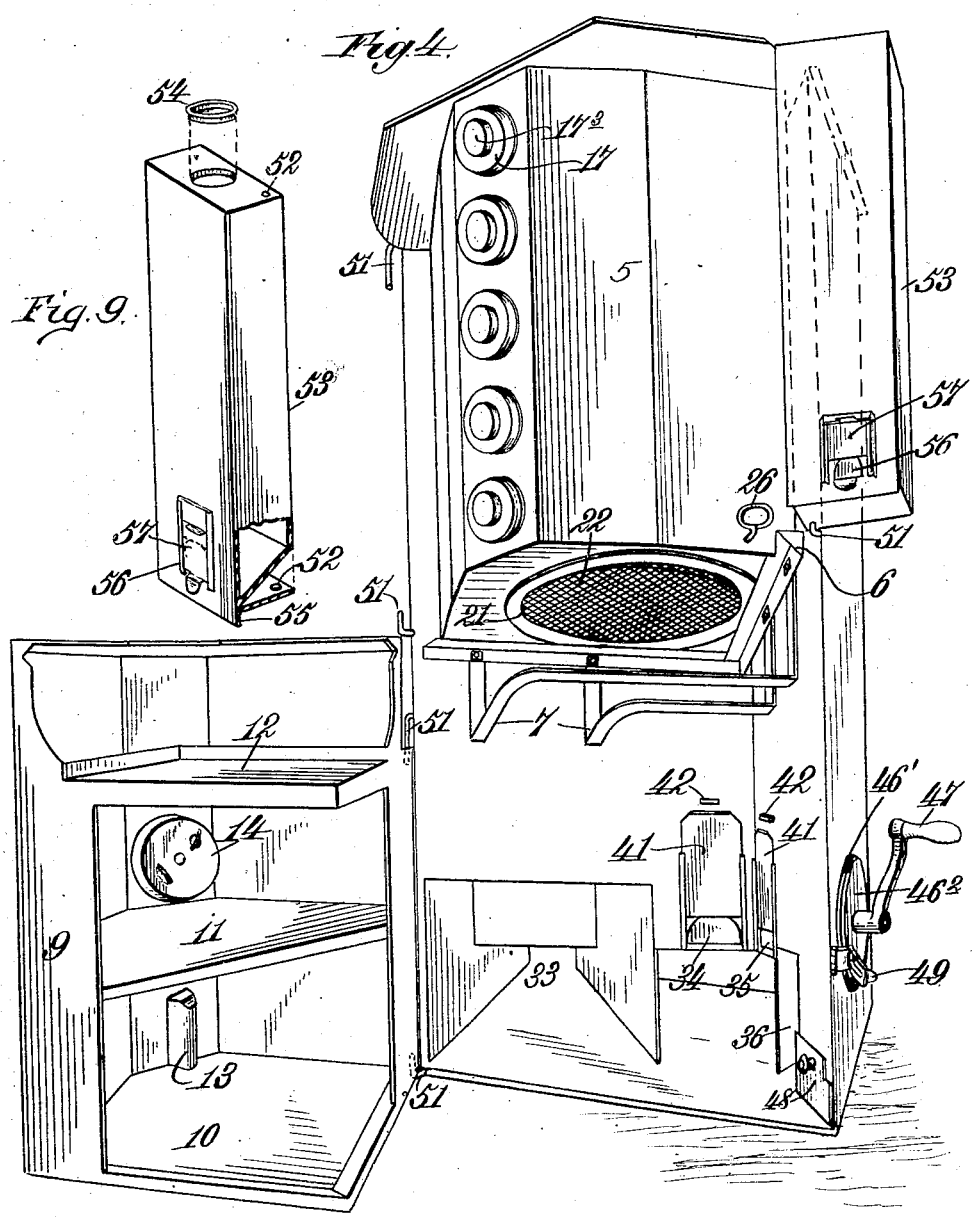
Witnesses
Robert Everitt,
James L. Norris, Jr.
Inventor:
Irvin O. Curtice.
By James L. Norris.
Atty.

UNITED STATES PATENT OFFICE.

IRVIN O. CURTICE, OF KANSAS CITY, MISSOURI.

KITCHEN-CABINET.

No. 854,569.  Specification of Letters Patent.  Patented May 21, 1907.

Application filed August 17, 1906. Serial No. 331,028.

*To all whom it may concern:*

Be it known that I, IRVIN O. CURTICE, a citizen of the United States, residing at Kansas City, in the county of Jackson and State of Missouri, have invented new and useful Improvements in Kitchen-Cabinets, of which the following is a specification.

The invention relates to a kitchen cabinet, and more particularly to the class of cabinets for the reception of cereals, spices, and other accessories used for cooking purposes.

The primary object of the invention is the provision of means for receiving ingredients for cooking and keeping the same protected from the atmosphere, dust, and the like.

A further object of the invention is the provision of means for receiving cooking ingredients which may be accessible, and extracted in the desired quantities.

A further object of the invention is the provision of means for storing kitchen articles or utensils and cooking ingredients in a unique and compact manner.

A still further object of the invention is the provision of means for receiving cooking materials or utensils and having detachable and hinged sections for receiving any desired material and quantity.

A still further object of the invention is the provision of means for receiving cooking materials and having the compartments forming the receptacles conveniently accessible, and so arranged that when the hinged section forming a cake or bread receptacle is closed the other sections forming the cabinet are held in a closed position and lockable, and the same can be filled at the top of the cabinet.

Other objects of the invention is the provision of a cabinet of a character constructed which will be durable, inexpensive in the manufacture, efficient in operation, and simple in the construction thereof.

With these and other objects in view, the invention consists in the construction, combination and arrangement of parts as will be hereinafter more properly described, and as illustrated in the accompanying drawings disclosing the preferred embodiment of the invention; however, it is to be understood that variations, modifications and changes may be made as come properly within the scope of the claims hereunto appended.

In the drawings:—Figure 1 is a front view in elevation of the cabinet; Fig. 2 is a sectional view taken on the line 2—2 of Fig. 7; Fig. 3 is a transverse sectional view taken on the line 3—3 of Fig. 1; Fig. 4 is a perspective view of the cabinet having the hinged section thrown open; Fig. 5 is a detached view of the removable section; Fig. 6 is a sectional view thereof; Fig. 7 is a top plan view of the cabinet; Fig. 8 is a detail sectional view of one of the canisters removed from the cabinet; Fig. 9 is a perspective elevation of one of the detachably hinged side sections forming a cereal receptacle.

Similar reference characters indicate corresponding parts throughout the several views.

In the drawings the numeral 2 designates the kitchen cabinet proper having a body 3 constructed of sheet metal and which may be of any preferable shape and material. The body 3 having at its front portion a V-shaped recess 4 extending throughout the longitudinal extent thereof for receiving a removable section 5 correspondingly shaped to fit snugly in the V-shaped recess 4, the latter extending only a half distance of the said recess 4 and is supported on a bracket member 6, the same having supports 7 to receive a pan 8 of any ordinary construction. Hingedly connected to and detachable from the body 3 immediately below the section 5 is a swinging section 9 forming a bread and cake box, and the latter having shelves 10, 11 and 12 for receiving kitchen articles of miniature type, for instance, knives, forks, spoons and the like. Carried by the section 9 is a scale 13, the latter being of the usual construction and for weighing the ingredients to be used in cooking or otherwise. At the front face of the said swinging section 9 is connected a time piece 14 which can be set and regulated from the interior of the said section 9 for convenience. The removable section 5 has a plurality of cylindrical sockets 15 for receiving canisters 16 provided with screw caps 17, the latter having a screw-threaded off-set portion 17' provided with a plurality of openings 17² and receives a screw cap 17³ for covering the same. When said cap 17³ is removed the ingredients contained in the canister 16 can be dispensed through the openings 17². The said canisters 16 are capable of being removed from the sections 5 so that the same can be filled with spices or other ingredients. To maintain the removable section 5 in position within the recess 4 in the cabinet 2 is provided a yieldable spring 18 carried by said section 5 and having a knob 20 engaging in an opening 19 in the top of said cabinet, thereby locking the removable section 5 in position. Furthermore, the bottom of the removable section 5 has a circular opening 21, and covering the same is a reticulated plate 22 correspondingly shaped and secured in any suitable manner, the same forming a sieve. Pivotally connected by a bracket 23 above the reticulated plate 22 is an agitator wheel 24, sheet metal die formed with burred tire or flange the latter having pivotally connected thereto a rod 25 terminating in a handle 26 exterior of the section 5 so that the agitator wheel 24 can be manipulated to cause the ingredients contained in the section 5 to be sifted into the pan 8 supported below the said section. It is desired that the removable section 5 should receive flour or other analogous cereals, and at the top thereof is provided a removable cover 27 so that the cereal may be introduced into the compartment. Said body 2 is divided into compartments 28, 29, 30, 31 and 32, the same adapted to receive various ingredients and extend a greater distance throughout the longitudinal length of the body 2. The bottoms are slightly inclined toward the openings 33, 34, 35, 36 and 37, forming a discharge mouth for the compartments 28, 29, 30, 31 and 32, respectively, and which allows the ingredients to be dispensed through the latter into the utensils for receiving or measuring the same. The openings 34 and 35 in the compartments 29 and 30 respectively, are provided with slides 41 so as to form cut-offs therefor to prevent the ingredients from being dispensed from the several compartments until the slides are manipulated and brought away from the said openings 34 and 35. Stops 42 are secured to the body 2 to limit the movement of the slides 41. Below the compartment 31 is a shelf 43 for supporting a receptacle 44 having a handle 45 so that the same can be placed in position on the shelf 43 and removed therefrom, said receptacle 44 being for the purpose of measuring or receiving various cooking ingredients, and can be used at any locality within the cabinet 2.

Located in the lower end of the compartment 32 is a coffee mill 46 adapted to be operated by a hand crank 47, said mill being of the ordinary construction. In the side of the body 3 is formed an opening 46' communicating with the compartment 32, and through which the said coffee mill 46 is introduced into the latter and the said mill can be removed therefrom for the purpose of cleaning when desired. A removable cover, such as a cap $46^2$ for the opening 46' is provided. Below the shelf 43 is a receptacle 48 for receiving the ground coffee from the coffee mill 46. The coffee grains are introduced into the compartment 32 at the top thereof and by gravity are fed to the coffee mill 46 which grinds the coffee grains, and then are discharged into the receptacle 48 below the coffee mill. Each of the respective compartments 28, 29, 30, 31 and 32 at the top of the cabinet 2 is provided with a removable screw cap 48' so that the said compartments can be filled in any convenient manner. The swinging section 9 has at the exterior thereof a hasp 49 engaged by a staple 50 carried by the body 3 of the cabinet for locking the said section in a closed position.

Fixed to the body 3 of the cabinet 2 at opposite sides thereof are hook members 51 forming hinges for engagement in sockets 52 in detachable swinging side sections 53 which sockets are formed near one corner thereof at the top and bottom of the same. Said swinging side sections 53 are also adapted to fit within the recess 4 when in a closed position and while in such position lie contiguous with the outer face of the removable section 5. The said side sections 53 at the top thereof are provided with an opening and cap 54 for introducing cereals to the interior thereof and at one side thereof is depending a flange portion 55 adapted to be engaged by the swinging hinge section 9, and when the latter is in a closed position locks the side sections 53 against movement. Each of the sections 53 is provided with an opening 56 forming a discharge aperture for the cereals. For governing the said opening 56 is provided slides 57 forming cut-offs.

It will be obvious that by hingedly connecting the side sections 53 to the body 3 of the cabinet 2 the said sections can be swung to an open or closed position, and when in the latter position are locked against movement by the flanges 55 in engagement with the top of the swinging section 9 when the latter is closed. The swinging section 9 is also hinged to the body 3 by similar hooks 51 engaging in sockets 52 the same as those formed in the side sections 53 so as to allow the detachment if desired of the said section 9 for the purpose of cleansing the same.

It is to be understood that the metal body forming the cabinet 2 proper and other detachable sections carried thereby may be japanned or otherwise coated as found desirable to protect the same against rust and inclement weather. For connecting the cabinet 2 to a wall or other suitable place is provided bracket members 58 pivotally connected at the back of the body 3.

Having described the invention, what is claimed, is:

1. A cabinet of the class described, involving a body having a plurality of compartments, each terminating with an inclined bottom and having a mouth opening, said body having a recess throughout its longitudinal extent, a removable section supported in said recess, and a hinged section arranged below the removable section and adapted to fit within the recess.

2. A cabinet of the class described, involving a body forming a plurality of compartments independent of each other, removable caps for the compartments for introducing ingredients therein, said body having a V-shaped recess at the front thereof, a bracket having a support for holding a pan or other receptacle and secured in the recess, a detachable section forming a compartment mounted on said bracket and having a plurality of sockets, canisters detachably mounted in the sockets, a hinged section arranged below the support and adapted when closed to fit within the recess, shelves at the interior of said section for supporting articles, and a clasp carried by the body and engageable with the hinged section for holding the same in a closed position.

3. A cabinet of the class described, having a body including a plurality of compartments, the latter having inclined bottoms terminating in openings forming a mouth portion for discharging the contents, of the compartment, slides for at least two of the compartment, for controlling the openings to open and close the same, a removable front section a bracket having a pan support secured to the body for supporting the removable section, a plurality of detachable canisters carried by the removable section and having removable caps, a swinging section hinged to said body and having shelves arranged one above the other for receiving articles and also for forming a bread box, means for holding the swinging section in a closed position, each of said compartments having an opening at the top of the body for introducing ingredients therein, and removable covers for the said openings.

4. A cabinet of the class described, having a body including a plurality of compartments, the latter having inclined bottoms terminating in openings forming mouth portions for discharging the contents of the compartments, slides for at least two of the compartments for controlling the openings to open and close the same, a removable front section, a bracket having a pan support secured to the body for supporting the removable section, a plurality of detachable canisters carried by the removable section and having removable caps, a swinging section hinged to said body and having shelves arranged one above the other for receiving articles and also for forming a bread box, means for holding the swinging section in a closed position, each of said compartments having an opening at the top of the body for introducing ingredients therein, and removable covers for the said openings.

5. A cabinet of the class described, having a body including a plurality of compartments, the latter having inclined bottoms terminating in openings forming mouth portions for discharging the contents of the compartments, slides for at least two of the compartments for controlling the openings to open and close the same, a coffee mill mounted in one of the compartments, and a removable receptacle below said coffee mill for receiving the grindings from the mill, a removable front section, a bracket having a pan support secured to the body for supporting the removable section, a plurality of detachable canisters carried by the removable section and having removable caps, a swinging section hinged to said body and having shelves arranged one above the other for receiving articles and also for forming a bread box, means for holding the swinging section in a closed position, means for detaching the same, each of said compartments having an opening at the top of the body for introducing ingredients therein, and removable covers for the said openings, said body having a plurality of recesses below the compartments.

6. A cabinet of the class described, involving a body having a plurality of compartments, said body having a recess throughout its longitudinal extent, a removable section supported in said recess, and a plurality of detachably hinged sections connected to said body, one of said sections when closed adapted to lock the remaining sections against movement.

7. A cabinet of the class described, involving a body having a plurality of compartments, a removable section supported by said body and having a plurality of sockets, canisters mounted in said sockets and detachable therefrom, and detachably hinged sections supported by said body for interlocking engagement with each other when the sections are brought to a closed position.

8. A cabinet of the class described involving a body having a plurality of compartments, a removable section supported by said body, said removable section being provided with a reticulated bottom and further provided with a plurality of sockets, canisters mounted in said sockets and detachable therefrom, and detachably hinged sections supported by said body for interlocking engagement with each other when the sections are brought to a closed position.

9. A cabinet of the class described involving a body having a plurality of compartments, a removable section supported by said body and having sockets, said removable section having a plurality of canisters mounted in said sockets and detachable therefrom, and detachably hinged sections supported by said body for interlocking engagement with each other when the sections are brought to a closed position.

In testimony whereof I have hereunto set my hand in presence of two subscribing witnesses.

IRVIN O. CURTICE.

Witnesses:
D. S. TORELL,
J. W. H. TROMANS.